United States Patent [19]

Izumi

[11] Patent Number: 5,126,544
[45] Date of Patent: Jun. 30, 1992

[54] BAR CODE READER
[75] Inventor: Masaki Izumi, Yokohama, Japan
[73] Assignee: Eastman Kodak Company, Rochester, N.Y.
[21] Appl. No.: 684,125
[22] Filed: Apr. 12, 1991
[30] Foreign Application Priority Data May 2, 1990 [JP] Japan .................. 2-116655

[51] Int. Cl.$^5$ ............................................. G06K 7/10
[52] U.S. Cl. .................. 235/462; 235/454; 235/456; 235/470; 235/472
[58] Field of Search ............... 235/462, 454, 456, 420, 235/472, 437; 382/1, 9, 10, 11, 18, 51

[56] References Cited

U.S. PATENT DOCUMENTS

| 4,323,772 | 4/1982 | Serge ........................... 235/463 |
| 4,652,730 | 3/1987 | Marshall ....................... 235/436 |
| 4,860,275 | 8/1989 | Kakinuma et al. ............ 235/454 |
| 4,866,784 | 9/1989 | Barski ............................ 382/9 |
| 4,896,025 | 1/1990 | Kasegawa ...................... 235/454 |
| 4,916,298 | 4/1990 | Raphaël ......................... 235/470 |
| 4,931,628 | 6/1990 | Wada ............................. 235/454 |
| 4,988,852 | 1/1991 | Krishnan ....................... 235/472 |
| 5,019,699 | 5/1991 | Koenck .......................... 235/470 |
| 5,023,922 | 6/1991 | Abramovitz et al. .......... 235/472 |

FOREIGN PATENT DOCUMENTS 0294716 12/1988 European Pat. Off. ......... 382/10

Primary Examiner—Stuart S. Levy
Assistant Examiner—Tan Nguyen
Attorney, Agent, or Firm—Raymond L. Owens

[57] ABSTRACT

A barcode reader provided with a skewed reading circuit is provided wherein the image of a barcode symbol to be scanned by a scanner is divided into as multiplicity of pixels by dividing it in the scanning direction of the scanner and the direction orthogonal to the scanning direction and the pixels or the binary data corresponding to the pixels along lines of a skewed reading direction which are relative to the scanning direction of the scanner by a specified angle of n (Θ) are read out by the skewed reading circuit where n is an integer greater than 1. This skewed reading circuit allows the angle allowable for scanning and readign when the barcode symbol is skewed relative to the scanning direction.

7 Claims, 4 Drawing Sheets

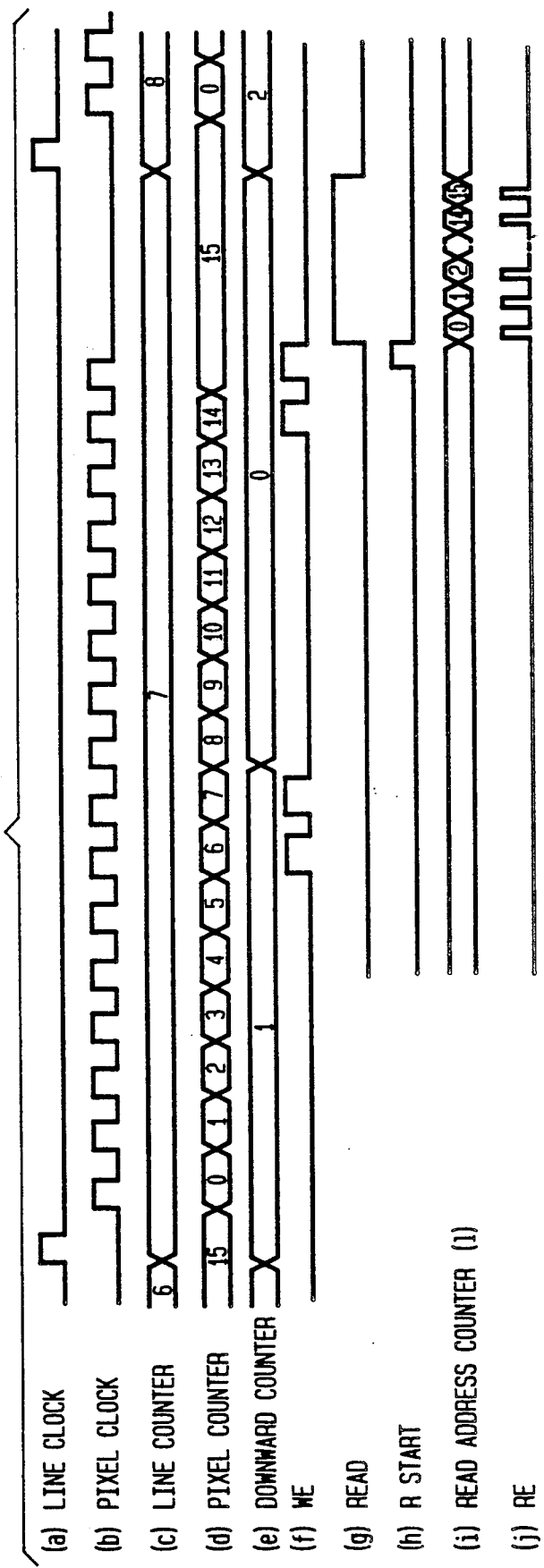

BAR CODE READER

FIELD OF THE INVENTION

The present invention relates to a barcode reader adapted to read a barcode printed on a document and, more particularly, to a barcode reader adapted to expand the angle in which barcode symbols can be scanned when such a barcode symbol is skewed relative to the direction of scanning by a scanner and which is thus capable of enhancing the recognition rate of barcodes.

DESCRIPTION OF PRIOR ARTS

FIG. 1 is the block diagram showing the constitution of a barcode reader according to a prior art. The barcode symbol 7 printed on a piece of paper 1 is scanned by the line sensor 2 composed of a CCD array or the like in a scanner in the direction shown by the arrow designated "p" the main scanning direction) and is read. Then it is converted to a digital value by the A/D converter 4 by way of the amplifier 3. The output from the A/D converter 4 is converted into binary values of "1" or "0" corresponding to the bar portions or the space portions of the barcode symbol 7 by the two value converting binarization circuit 5, and further into corresponding alphanumeric codes by the decoder 6. The paper 1 is successively fed in the direction designated by the arrow designated l (the letter l) (in the sub-scanning direction) by the transfer mechanism (not shown). Accordingly one barcode symbol 7 is actually scanned in the direction designated by the arrow p many times. However since the result of decoding is always the same, the same data will be discarded in the circuits (now shown) which follow the decoder 6.

When the barcode symbol 7 is read by the scanner, it is likely that the direction of the bar and space portions of the barcode symbol 7 may be skewed relative to the main scanning direction (the direction designated by the arrow p) of the line sensor 2 as shown in FIG. 2. More specifically in such cases, when the main scanning direction of said line sensor 2 is not in a position to be able to entirely scan the bar and space portions of said barcode symbol 7, or the skewed angle of the arranged direction of the barcode symbol 7 relative to the main scanning direction "p" of said line sensor 2 has exceeded the angle $-\Theta$ shown in FIG. 3(a) and the angle $+\Theta$ shown in FIG. 3(b), the line sensor 2 an no longer entirely detect the barcode symbol 7.

SUMMARY OF THE INVENTION

The present invention has been proposed in consideration of the problems relative to prior arts as described above and has it as an object to provide a barcode reader adapted to expand the angle in which the barcode symbol can be read when the arrangement direction of the barcode symbol is skewed relative to the scanning direction of a sensor so as to enhance the recognition rate of barcode symbols.

The barcode reader according to the present invention comprises a scanner a binarization means, and a skewed reading means. The scanner is adapted to successively scan a barcode symbol in the first scanning direction and, in addition to this scanning, scan the barcode in the second scanning direction being at right angles to the first scanning direction so as to detect the image of the barcode symbol in a two dimensional manner. The binarization means is adapted to convert the output from said scanner to the binary data of 1 or 0 respectively corresponding to either of bar or space portions of a barcode symbol. The skewed reading means is adapted to split the image of said barcode symbol out of the binary values output from binarization means into an optional number along the first scanning direction as well as into the number corresponding to the scanning frequency in the first scanning direction along said second scanning direction to obtain a multiplicity of pixels, and read out along lines of the skewed reading direction only such binary data respectively corresponding to the pixels arranged along the lines of the skewed reading direction skewed by a specified angle of $n(\Theta)$ relative to said first scanning direction where n is an integer greater than 1, and a decoder adapted to decode the output from said skewed reading means into data such as alphanumeric codes.

According to the barcode reader thus constituted, the skewed reading means is adapted to read along the skewed reading direction only such binary data corresponding to the respective pixels along line of the skewed reading direction skewed by a specified angle $n(\Theta)$ relative to the first scanning angle out of the binary data output from binarization means, the pixels being formed by splitting the image of the barcode symbol by specified times along the first scanning direction as well as the times equivalent to the scanning frequency of said first scanning direction along said second scanning direction. Accordingly, even if it is impossible to read the data of the entire barcode symbol with the binary data corresponding to the respective pixels along the first scanning direction due to the first scanning direction being greater than the angle $+\Theta$ or $-\Theta$ (see FIG. 3), it is possible according to the present invention to read the entire data of the barcode symbol from the binary data read out by said skewed reading means when the skewed reading direction is arranged in a direction enabling the entire bar and space portions of the barcode symbol to be scanned.

An embodiment of the present invention will now be explained by referring to the accompanying drawings wherein;

BRIEF DESCRIPTION OF THE DRAWINGS

FIGS. 5(a) and 5(b) are the conceptual diagrams showing the principle of skewed reading by a skewed reading circuit in the bar code reader of FIG. 4;

FIG. 7 is the time chart showing the operation of the skewed reading circuit shown in FIG. 6.

DESCRIPTION OF THE PREFERRED EMBODIMENT

Figure 1:
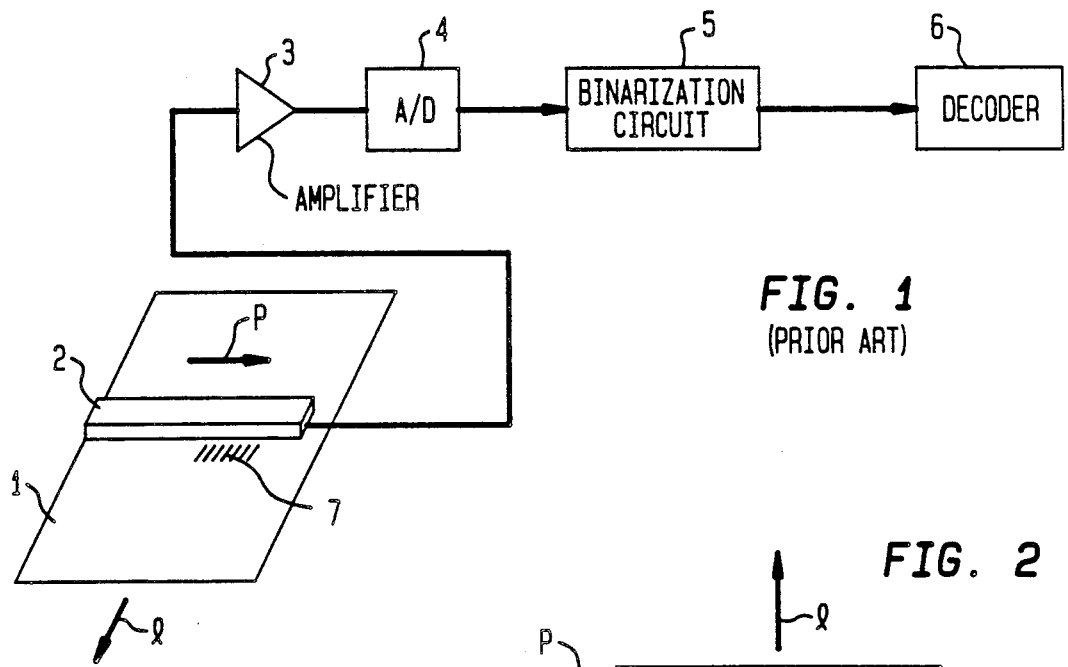
FIG. 1 is the block diagram illustrating a barcode reader according to a prior art.
Figure 2:
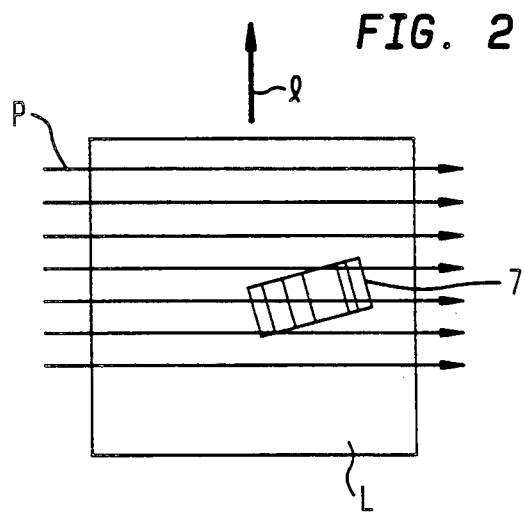
FIG. 2 illustrates how the problems are caused by the barcode reader according to a prior art.
Figure 3A:
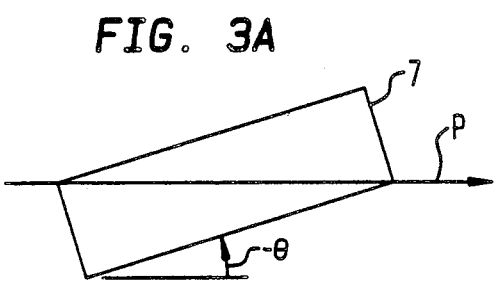
FIGS. 3 (a) and (b) illustrate the maximum skewed angles relative to the scanning direction of a scanner for a barcode symbol which permits the barcode symbol to be properly recognized by the barcode reader according to a prior art.
Figure 3B:
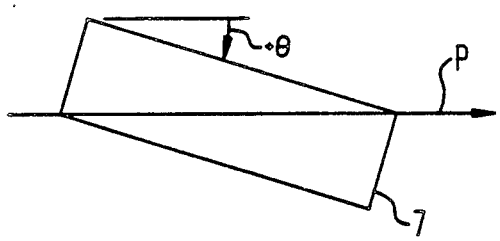
Figure 4:
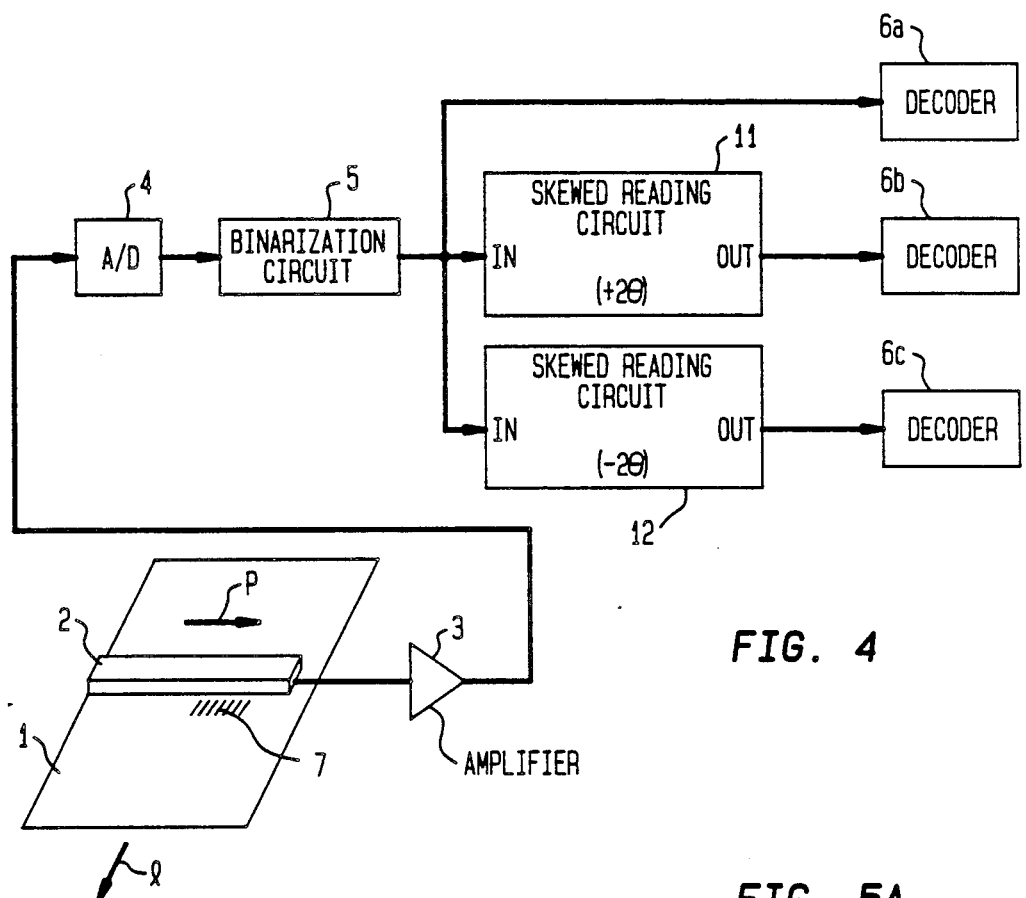
FIG. 4 is the block diagram for showing an embodiment of a bar code reader in accordance with the present invention.

In FIG. 4, such portions common to those shown in FIG. 1 are denoted with the same numerals and explanation thereof is not repeated. In FIG. 4, the output from the binarization circuit 5 is input respectively to the decoder 6a, the skewed reading circuit 11 and the skewed reading circuit 12. When the skewed angle of the arrangement direction of the barcode symbol 7 relative to the main scanning direction (the direction designated by the arrow p) of the line sensor 2 comprising a CCD array and the like is within $\pm\Theta$ range, the decoder 6a may output alphanumeric codes corresponding to the entire barcode symbol 7. When the skewed angle of the arrangement direction of the barcode symbol 7 relative to the principal scanning direction of the line sensor 2 is more than $+\Theta$ and less than $+3\theta$ as viewed in FIG. 3(a), the skewed reading circuit 11 is adapted to rearrange the binary data array to be the same as the binary data array obtained at the time of scanning with the angle of $+2\Theta$ based on the output from the binarization circuit 5 and transfer the result to the decoder 6b. The decoder 6b is, in turn, caused to output the alphanumeric codes corresponding to the entire barcode symbol 7. When the skewed angle of the arrangement direction of the barcode symbol 7 relative to the principal direction of the line sensor 2 is more than $-\Theta$ and less than $-3\Theta$ as viewed in FIG. 3(b), the skewed reading circuit 12 is adapted to rearrange the binary data array to be the same as the binary data array obtained at the time of scanning with the angle of $-2\Theta$ based on the output from the binarization circuit 5 and transfer the result to the decoder 6c. The decoder 6c is, in turn, caused to output the alphanumeric codes corresponding to the entire barcode symbol 7.

Principle of operation of said skewed reading circuit 11 for skewedly reading the binary data from the binary circuit 5 in the $+2\Theta$ angular direction $+2\Theta = +22.50$ the present embodiment) will next be explained by referring to FIG. 5. As shown in FIG. 5(a), the image data read by the line sensor 2 is provided with the line numbers provided for each scanning by the line sensor 2 and the pixel numbers corresponding to each element (CCD element, for example) of the line sensor 2 (in FIG. 5, the width of the document in the scanning direction is split into a 16 pixel width for simplicity of illustration). In this way, the image data read by the line sensor 2 is divided into pixel data specified by said respective line number and pixel number. The line sensor 2 is adapted to read the image data for each line number shown in FIG. 5(a), while the skewed reading circuit 11 is adapted to pick up such pixel data lying only on the dashed lines of the angular direction of $+2\Theta$ shown in FIG. 5(a) out of the respective pixel data and store said pixel data successively in the memory. As soon as the pixel data for one dashed line for the angular direction of $+2\Theta$ (the pixel No. 0–15) is stored in the memory, the pixel data for that one dashed line is read out from the memory immediately and transferred to the decoder 6b. In this way, a binary data array is obtained similar to the one obtained when the bar code symbol 7 is scanned along the dashed line with said $2\Theta$ angle by the line sensor 2.

Figure 5A:
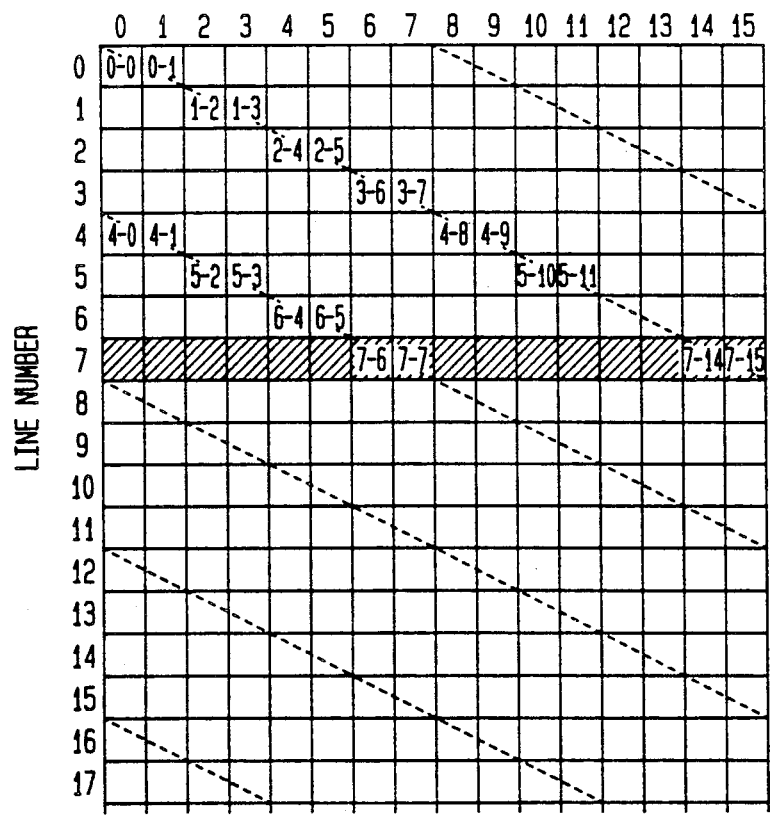
Figure 6:
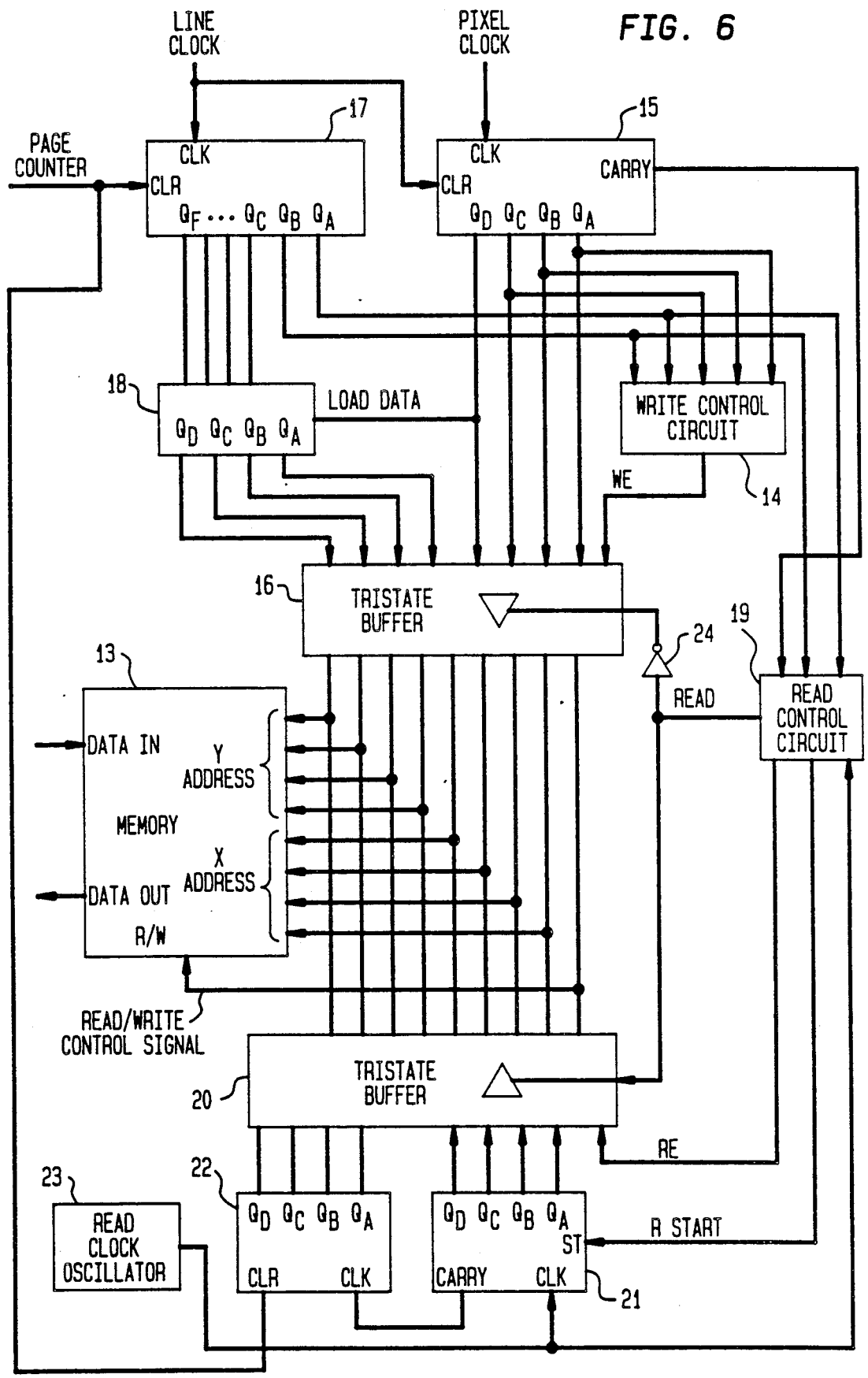
FIG. 6 is the block diagram showing the internal constitution of the skewed reading circuit shown in FIG. 4.

The internal constitution of the skewed reading circuit 11 for implementing the skewed reading operation as above described is next explained by referring to the block diagram in FIG. 6. In FIG. 6, the memory 13 is adapted to store only the pixel data along the dashed line with a $+2\Theta$ angle as viewed in FIG. 5(a) out of the respective binary data corresponding to the respective pixel data successively output from the binarization circuit 5 in accordance with the control signals from the write control circuit 14. The write control circuit 14 is adapted to generate WE (write enable) signals only when the binary data to be written in the memory 13 from the binarization circuit 5 are output, and make up said WE signals by use of the $Q_A$ and $Q_B$ output of the line counter 17 or the signals for indicating what order the line in question has in the lines for every 4 lines and $Q_A$–$Q_C$ output of the pixel counter 15 or the signals for indicating what order the pixel in question has in the pixels for every 8 pixels and output said WE signals to the read/write control signal input terminal of the memory 13 via the tristate buffer 16. It is to be understood, in this regard, that the reason why the write control circuit 14 is so designed that, as described above, the line counter 17 is caused to output WE signals when it has counted the line clocks in the order of quadruple multiples and the pixel counter 15 has counted the line clocks in the order of octuple multiples is that it is necessary to store two adjacent pixel data every time the line number is increased by four and the pixel number is increased by eight.

As shown in FIG. 6, the pixel counter 15 is adapted to count the number of pixel clocks, and provide the count to the memory 13 via the tristate buffer 16 from $Q_A$–$Q_D$ terminals as the x address of 4 bit which indicate the location of storage of said pixel data. Also, the line clocks are input to the clearing terminal of the pixel clock 15.

The line counter 17 and the down counter 18 shown in FIG. 6 are used to provide to the memory 13 the y address of 4 bit indicating the storage location of said pixel data in the memory 13. Namely, the line counter 17 is adapted to count the number of line clocks and provide the $Q_C$ to $Q_F$ output more than the third bit (4 bit data) from LSB and of the count values to the down counter 18 as the initial value. Then, the down counter 18 is adapted to provide said initial value data to the memory 13 via the tristate buffer 16 as y address of four bit. Furthermore, when "1" signals from the $Q_D$ terminal indicating that said pixel counter 15 has counted the eighth pixel clock is input to the clock input terminal of the down counter 18, said counter 18 is caused to reduce the initial value data by 1 and provide said reduced value to the next y address in the memory 13 via said tristate buffer 16. It is to be understood in this connection that the reason why the $Q_C$–$Q_F$ output which are more than the third bit data from LSB are used out of 6 bit data of $Q_A$–$Q_F$ output of the line counter 17 as the initial value data to the down counter 18 is because as shown in FIG. 5(b) according to the present embodiment every time when the line number is increased by 4 (or the $Q_A$ and $Q_B$ output of the line counter 17 becomes "00" from "11"), the y address is advanced by one. According to the present invention, the down counter 18 is interposed between the line counter 17 and the memory 13, so that after the initial value of the down counter 18 established by $Q_C$–$Q_F$ output of the line counter 17 is provided to the memory 13 as a y address, the value obtained by reducing the initial value by 1 is provided to said y address when the pixel counter 15 has counted the eighth pixel clock. The reason of this arrangement is as follows. For example, assuming that the line sensor 2 has scanned the data along the line number 7 in FIG. 5(a), the pixel data at 7-6 and 7-7 in FIG. 5(a) are stored at the location of y address being 1 of the memory 13, while the pixel data at 7-14 and 7-15 in FIG. 5(a) are stored at the location of the y address being 0 (=1−1) of the memory 13. In this way, according to the present embodiment, pixel data having the same line number are stored in the memory 13 two times or every time the pixel number is increased by 8 and the y address of those two pixel data having the same line number which are stored at the second time corresponds to the value obtained by reducing 1 from the y address of two pixel data which were stored at the first time.

In FIG. 6, the memory 13 is adapted to complete skewed reading of data for one skewed dotted line in FIG. 5(a) every time the line number in FIG. 5(a) is increased by 4. According to the present embodiment, every time the binary data for one dashed line is written into the memory 13, the binary data for said one dotted line may be read out immediately. More specifically, when the signal indicating that the count of the pixel clocks has exceeded 16 is input from the carry output terminal of the pixel counter 15 and the signal ("11") indicating that the count of the line clocks from the $Q_A$ and $Q_B$ terminals of the line counter 17 are the fourth count counted from 0 is input, the read control circuit 19 outputs RSTART signals to the read address counter (I)21. The read address counter (I)21 will, in turn, start counting the read clocks from the read clock oscillator 23 when said RSTART signals are input and provide the count to the memory 13 via the tristate buffer 20 as the lower 4 bits of the read address of 8 bits. The carry signals which will be outputted when the read address counter (I)21 has counted the sixteenth read clock are provided as the clock input to the read address counter (II)22. The read address counter (II)22 is adapted to count the clock input and provide the count to the memory 13 via the tristate buffer 20 as the upper 4 bits of the read address out of 8 bits the count value of said read address counter (II)22 will be cleared by the page clock inputted from the page clock oscillator, not shown.

The read clock from the read clock oscillator 23 are inputted to the read control circuit 19. When said read clocks are inputted after said RSTART signals have been outputted, the read control circuit 19 is adapted to output RE (read enable) signals comprising 16 pulses synchronously to the input terminal for the read/write control signals of the memory 13 via the tristate buffer 20. On the other hand, the memory 13 is adapted, when the RE signals are inputted thereto, to output the binary data for the one dotted line in accordance with the read address provided from the read address counter (I)21 and the read address counter (II)22. The reason why the condition of the read control circuit 19, providing RE signals at the time of reading the pixel data for the one dotted line, is set at the time when the carry signals indicating that the count of the pixel clocks from the pixel counter 14 exceeds 16 as above mentioned are inputted and the signals indicating that the count of the line clocks from the line counter 17 corresponds to the fourth clock are inputted, is that every time the pixel number is increased by 16 and the line number is increased by 4 as shown in FIG. 5(a), the skewed reading data for the one dotted line will be written in the memory 13.

It is to be noted that when the pixel data for the one dotted line are read out, a READ signal is outputted from the read control circuit 19 and thus the READ signal is reversed and inputted to the control input terminal of the tristate buffer 16 via the inverter 24 and also inputted directly to the control input terminal of the tristate buffer 20. Accordingly, the data to be transferred to the memory 13 from the write control circuit 14, the pixel counter 15, and the line converter 17 is prevented from interfering with the data to be transferred to the memory 13 from the read control circuit 19, the read address counter (I)21, and the read address counter (II)22.

Operation of the skewed reading circuit 11 shown in FIG. 6 is then explained by referring to the time chart shown in FIG. 7. In FIG. 7, (a) and (b) designate respectively the line clock and the pixel clock, (c), (d) and (e) respectively show operations of the line counter 17, the pixel counter 15 and the downward counter 18.

Operation at the time of writing the pixel data into the memory 13 is firstly explained. It is to be understood that, in FIG. 7, the eighth line clock is input and the four pixel data, i.e., 7-6, 7-7 and 7-14, 7-15 of the line number 7 shown in FIG. 5(a) are written into the memory 13.

At the time of writing pixel data, the pixel counter 15 is adapted to commence counting of the pixel clocks from 0 when the line clock is input to the clearing input terminal. The pixel counter 15 is caused to transfer the lower 3 bits out of the counts from the $Q_A$-$Q_C$ output terminals to the write control circuit 14 and provide the count of 4 bit to the memory 13 from the $Q_A$-$Q_D$ output terminals as the x address for writing pixel data. When the fourth line clock is input, the line counter 17 is caused to transfer the lower 2 bit or "11" out of the count to the write control circuit 14 from the $Q_A$ and $Q_B$ output terminals and also provide the upper 4 bit "0001" out of the count to the down counter 18 from the $Q_C$-$Q_F$ terminals as the initial value. The down counter 18 will provide this initial value to the memory 13 as y address for writing the pixel data.

Subsequently when the pixel counter 15 has counted the seventh and eighth pixel clocks, the write control circuit 14 is caused to output two WE signals (pulses) and the memory 13 is caused to write two pixel data, or said 7-6, 7-7. (See FIG. 7(f).)

Subsequently, when the pixel counter has counted the ninth pixel clock, the down counter 18 to which the clock is input from −⊖ output terminal of the pixel counter 15 will provide the value "0000" obtained by reducing 1 from the initial value to the memory 13 as y address (see FIG. 7(e)). Then, when the pixel counter 15 has counted the fifteenth and sixteenth pixel clocks, the write control circuit 14 is caused to output two WE signals in a similar manner as previously described, and the memory 13 is caused to write two pixel data, or said 7-14, 7-15 in the memory 13. It is to be noted that writing the pixel data of 7-14 and 7-15 will complete writing of binary data array for the one dotted line shown in FIG. 5(a) (namely 16 units of pixel data from 0-0 to 7-15).

Operation of reading the binary data array for said one dotted line will next be explained. When writing the binary data array for the one dashed line in the memory 13 is finished, the read control circuit 19 is caused to generate various signals necessary for reading as shown in FIG. 7 (g), (h) and (j). More specifically, when the carry signal is provided to the read control circuit 19, said carry signal is output when the line counter 17 has counted the fourth line clock and the lower 2 bits out of the count are output to the read control circuit 19 and the pixel counter 15 has counted the sixteenth pixel clock, the read control circuit 19 is caused to output a RSTART signal as shown in FIG. 7(h) to the input terminal for the start signal of the read address counter (I)21. Upon reception of the RSTART signal, the read address counter 21 in turn will commence counting of the reading clocks (see FIG. 7(i) from the read clock oscillator 23. Simultaneously, the read control circuit 19 is caused to output a READ signal (see FIG. 7(g)), and enable the tristate buffer 20 and bring the tristate buffer 16 into a high impedance condition. The read control circuit 19 is also caused to output the RE (write enable) signal comprising 16 pulses synchronously with counting the read address counter (I)21 (see FIG. 7(j)). By this operation, the binary data array for the one dotted line in the memory 13 will be read out in accordance with a read address prepared on the basis of the reading clocks and provided to the decoder 6b in the next stage.

Explanation which has been made by referring to FIG. 5 through FIG. 7 has dealt only with the skewed reading circuit 11 shown in FIG. 4. However, the operational principle, constitution and operation of the skewed reading circuit 12 shown in FIG. 4 is the same as the circuit 11 except the skewed reading direction being different, or $-\Theta$ direction instead of $+\Theta$ direction.

Although the present invention has been explained in detail in accordance with an embodiment thereof, the present invention should not be limited to the discussed embodiment but can be changed in various way without departing from the principle of the invention. For example, while the present embodiment provides the skewed angle allowing the barcode reader to read a barcode symbol when it is skewed relative to the scanning direction of the line sensor 2 to be two times as large as the maximum skewed angle $\pm\Theta$ (see FIG. 3) allowing the conventional barcode reader to read a skewed barcode symbol, the present invention is not limited to this skewed angle but is capable of employing the skewed reading direction to be $\pm n \times \Theta$ (n is an integer) or any optional angle which is more than $\pm 2\Theta$ or less than $\pm 2\Theta$.

Further according to the skewed reading circuits 11, 12, although only the binary data corresponding to the pixel data along the skewed reading direction of $+2\Theta$ or $-2\Theta$ out of all pixel data are selectively written in the memory 13 at the time of writing, the present invention is not limited to this selective writing, but it is possible to store the binary data corresponding to all pixel data in a matrix at the time of writing and selectively read only the binary data corresponding he pixel data along the skewed reading direction or $+2\Theta$ or $-2\Theta$ at the time of reading.

It is furthermore possible to employ a single decoder and switch three inputs to said decoder for decoding operation in place of preparing three decoders 6a–6c as shown in FIG. 4.

According to the present invention as described above, the skewed reading means is adapted to reconstruct the binary data array to be the same as the binary data array obtained when the image data detected in two dimensions by the scanner are scanned by the scanner in the skewed direction relative to the first scanning direction by a specified angle. Accordingly even when the data corresponding to the entire barcode symbol cannot be read only by the binary data corresponding to the respective pixels along the first scanning direction since the skewed angle of the arrangement direction of a barcode symbol relative to the first scanning angle is out of the range of the angle (see $+\Theta$ and $-\Theta$ in FIG. 3) in which the barcode symbol can be entirely scanned, the entire barcode symbol can be read from the binary data array read out by the skewed reading means when the skewed reading direction is oriented in the direction allowing the entire bar and space portions of the barcode symbol to be scanned.

The invention has been described in detail with particular reference to certain preferred embodiments thereof, but it will be understood that variations and modifications can be effected within the spirit and scope of the invention.

What is claimed is:

1. A barcode reading comprising:
   a scanner adapted to scan a barcode symbol successively in a first scanning direction and also to scan said barcode symbol in a second scanning direction orthogonal to said first scanning direction to detect an image of said barcode in a two dimensional manner;
   a binarization means adapted to convert an output from said scanner to binary data having a first and second binary value corresponding to a bar and space portion, respectively, of said barcode symbol;
   a skewed reading means adapted to receive the binary data from said binarization means and to access and read out only the binary data corresponding to respective pixels along lines of a skewed reading direction which are skewed relative to said first scanning direction by a specific angle which is greater than the angle between a long edge and a diagonal line of the bar code symbol, said pixels being provided by dividing the image of said barcode symbol by a first predetermined number along said first scanning direction and further, dividing the image of said barcode symbol by a second number corresponding to a scanning number in the first scanning direction along said second scanning direction; and
   a decoder adapted to decode the output from said skewed reading means into the data such as alphanumeric codes.

2. A barcode reader as claimed in claim 1 wherein said scanner includes a line sensor adapted to scan the barcode symbol in the arrangement direction of the symbol.

3. A barcode reader as claimed in claim 2 wherein said line sensor comprises a CCD array.

4. A barcode reader as claimed in claim 1 wherein said binarization means includes an A/D converter and a binarization circuit.

5. A barcode reader as claimed in claim 1 wherein said skewed reading means includes a memory adapted to store only the respective binary data corresponding to the respective pixels along said lines of the skewed reading direction which are along said specific angle out of the binary data output from said binarization means.

6. A barcode reading comprising:
   a scanner adapted to scan a barcode symbol successively in a first scanning direction and also to scan said barcode symbol in a second scanning direction orthogonal to said first scanning direction to detect an image of said barcode in a two dimensional manner;

a binarization means adapted to convert an output from said scanner to binary data having a first and second binary value corresponding to a bar and space portion, respectively, of said barcode symbol;

a skewed reading means adapted to receive the binary data from said binarization means and to access and read out only the binary data corresponding to respective pixels along lines of a skewed reading direction which are skewed relative to said first scanning direction by a specific angle which is greater than the angle between a long edge and a diagonal line of the bar code symbol, said pixels being provided by dividing the image of said barcode symbol by a first predetermined number along said first scanning direction and further, dividing the image of said barcode symbol by a second number corresponding to a scanning number in the first scanning direction along said second scanning direction comprising:

memory adapted to selectively store the binary data from said binarization means;

a write control circuit adapted to output write control signals to said memory every time each one of a pixel clock and a line clock provide a predetermined number of clock pulses;

a pixel counter adapted to count the pulses from the pixel clock and provide a count to said memory to form a part of a write address in response to a write control signal from the write control circuit;

a line counter comprising a predetermined number of sequential stages which are adapted to count pulses from the line clock and provide an output signal representing a binary count of said line clock pulses; and a down counter or an up counter adapted to receive the count from predetermined stages of the line counter as an initial value and provide a value obtained by reducing 1 or adding 1, respectively, from or to said initial value to said memory as a part of the write addresses every time when said initial value and said pixel clocks occur by a specified number; and a decoder adapted to decode the output from said skewed reading means into the data such as alphanumeric codes.

7. A bar code reader as claimed in claim 6 wherein said skewed reading means further includes:

a read control circuit adapted to output a start signal indicating commencement of counting pulses from a reading clock and output a read control signal to said memory when said pixels clock pulses have occurred by the number of pixels necessary for providing the data for one line in said skewed reading direction and said line clock pulses have occurred by the number of scanning in the first scanning direction necessary for providing the data for one line in said skewed reading direction; and a read address counter adapted to commence counting of said read clock pulses upon reception of said start signal and provide the count to said memory as a read address.

* * * * *